(12) United States Patent
Hwang et al.

(10) Patent No.: US 6,361,360 B1
(45) Date of Patent: Mar. 26, 2002

(54) EXPANDABLE STRAIN RELIEF FOR FLEXIBLE CABLE-LIKE MEMBERS

(75) Inventors: David Hwang; Edward Steketee, both of Fort Collins, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/669,788

(22) Filed: Sep. 26, 2000

(51) Int. Cl.[7] ............................. H01R 13/72; G02B 6/00
(52) U.S. Cl. ....................................... 439/501; 385/135
(58) Field of Search ................................. 439/501, 456; 385/134–136, 147

(56) References Cited

U.S. PATENT DOCUMENTS 5,511,144 A * 4/1996 Hawkins et al. ............ 439/135
5,894,540 A * 4/1999 Drewing ..................... 439/135

* cited by examiner

Primary Examiner—Paula Bradley
Assistant Examiner—Felix O. Figueroa

(57) ABSTRACT

A strain relief comprises a generally cylindrically shaped, spool-like member having at least one radial slot therein that extends along a portion of the length of the cylindrically shaped, spool-like member. The radial slot divides the cylindrically shaped, spool-like member into a first hemi-spool portion and a second hemi-spool portion. The radial slot also defines a bridge section that connects the first and second hemi-spool portions. The bridge section is severable to allow the second hemi-spool portion to be separated from the first hemi-spool portion.

25 Claims, 5 Drawing Sheets

EXPANDABLE STRAIN RELIEF FOR FLEXIBLE CABLE-LIKE MEMBERS

FIELD OF INVENTION

The present invention relates to strain relief devices in general and more specifically to an expandable strain relief for use with flexible, cable-like members.

BACKGROUND

Strain relief devices are well-known in the art and have been used for decades to prevent strain placed on cable-like members from being transferred to a connection made at the end of the cable. For example, strain relief devices for electrical cables typically transfer cable strain to a mounting bracket or chassis associated with the device, thereby greatly increasing the reliability of the electrical connection at the end of the cable. Strain relief devices come in a wide range of types and styles and are used in conjunction with nearly all types of electrically powered devices and appliances in industrial, commercial, and home applications.

While strain relief devices of the type described above are typically used to absorb and/or transfer strain applied to electrical cables and wires, the recent advent of fiber optic cables for transferring information and data between two or more devices has created a need to provide some sort of strain relief device for fiber optic cables. Unfortunately, however, the physical characteristics and construction of fiber optic cables precludes the use of strain relief devices designed for use with electrical cables and wires. For example, most strain relief devices for electrical cables and wires function by tightly gripping or crimping the cable or wire. This does not pose a problem in electrical applications since most electrical cables and wires are sufficiently mechanically robust to resist such crimping forces without affecting their ability to transmit the electrical signal. However, the same cannot be said for fiber optic cables.

A typical fiber optic cable assembly comprises one or more individual fiber optic strands or "fibers" which conduct light by total internal reflection. The individual strands or fibers are typically fabricated from a transparent material, such as glass, although other materials can be used. The glass fiber may be coated or "doped" with another material having a refractive index that is less than that of the glass fiber. Such an arrangement allows light entering the end of the glass fiber to be conducted or guided along the fiber by means of total internal reflection. The glass fiber that actually transmits or conducts the light is commonly referred to as the core, while the surrounding material or dopant is typically referred to as the cladding. As mentioned above, one or more individual strands or fibers are typically bundled together to form the fiber optic cable. The fiber optic cable may then be covered with a cover or sheath to protect the fibers comprising the optic cable. The sheath may comprise any of a wide range of flexible plastic or rubber-like materials, depending on the particular application.

Regardless of the particular construction of the fiber optic cable, most fiber optic cables cannot tolerate excessive gripping or crimping forces, such as those typically applied by known strain relief devices. More specifically, such gripping or crimping forces may cause extreme bending of the optic fibers, which decreases or prevents them from conducting light across the bend. In extreme cases, the gripping or crimping forces may even fracture one or more of the individual optic fibers comprising the optic fiber cable.

Another characteristic of optic fiber cables that exacerbates the strain relief problem is that it is difficult to cut and/or splice the optic fiber in the field in order to shorten or lengthen the cable for a particular installation. Accordingly, most users of fiber optic cables obtain cables of at least the minimum lengths required. The extra lengths must then be accommodated somewhere in the installation. Since most fiber optic cables are supplied in a limited number of predetermined lengths, many users are faced with the task of accommodating a significant amount of extra cable length. Besides creating installation problems, such additional lengths can increase the likelihood that a user or other person will accidently become entangled in the extra cabling, increasing the chances that undue stress will be applied to the cable.

One type of strain relief system that has been developed for such fiber optic cables that provides some degree of strain relief as well as extra cable take-up comprises a foam-lined clamp assembly. The fiber optic cable may be secured within the foam-lined clamp, which supports the cable. Several such clamp assemblies can be used to route the fiber optic cable and provide the take-up required to store any extra cable length. Unfortunately, however, such foam-lined clamps are not without their problems. For example, such foam-lined clamp assemblies do not constrain the bend radius of the fiber cable. Consequently, excessive signal loss may occur if the cable is looped or wrapped too tightly around the strain relief (i.e., if the bend radius is too small). Another problem is that while the foam-lining on the clamp assembly prevents the clamp from exerting excessive force on the cable, it also limits the strain relief effectiveness, since the cable can easily slip within the foam-lined clamp.

Consequently, a need remains for a strain relief device that is suitable for use with fiber optic cable assemblies. Such a strain relief device should provide effective and robust strain relief to the cable, but without applying excessive crimping forces to the cable, which can degrade cable performance and may even damage the cable. Additional advantages could be realized if the strain relief device were also capable of providing the take-up necessary to absorb extra cable length.

SUMMARY OF THE INVENTION

A strain relief according to one preferred embodiment of the present invention may comprise a spool-like member defining at least one radial slot therein that extends along a portion of the length of the spool-like member. The radial slot divides the spool-like member into a first hemi-spool portion and a second hemi-spool portion. The radial slot also defines a bridge section that connects the first and second hemi-spool portions. The bridge section is severable to allow the second hemi-spool portion to be separated from the first hemi-spool portion.

Also disclosed is a method for relieving strain from a flexible, cable-like member that comprises the steps of: Providing a spool-like member having a radial slot therein that extends along a portion of the length of the spool-like member, the radial slot dividing the spool-like member into first and second hemi-spool sections, the radial slot also defining a bridge section connecting the first and second hemi-spool sections; and wrapping a portion of the flexible, cable-like member at least partially around the spool-like member.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
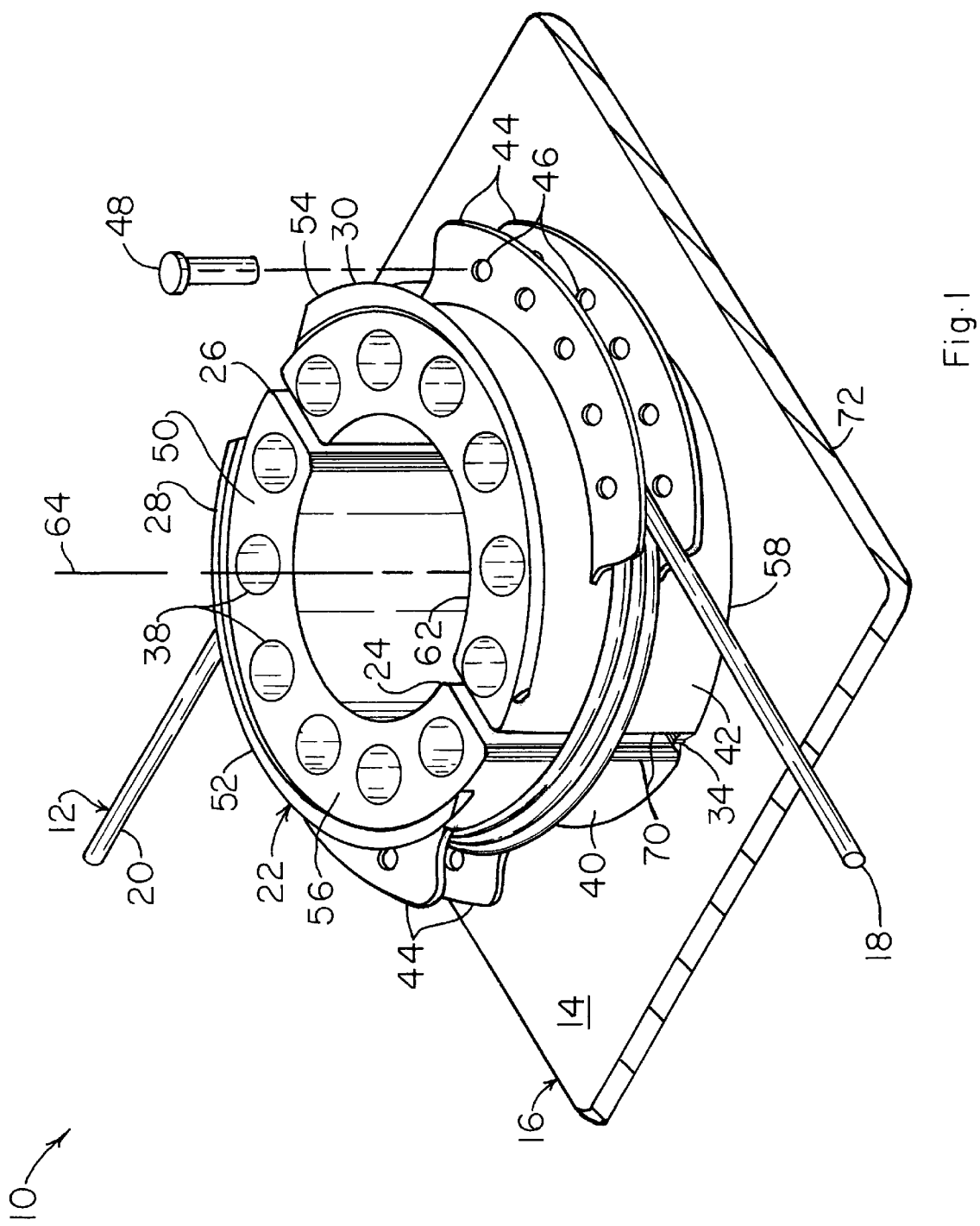
FIG. 1 is a perspective view of a strain relief assembly according to one embodiment of the invention.

A strain relief assembly 10 according to one embodiment of the present invention is shown in FIG. 1 as it could be used to provide strain relief to a fiber optic cable 12 that may be used to conduct optical data signals (not shown) between two or more devices (also not shown). The strain relief assembly 10 may be mounted to a portion 14 of the housing or chassis 16 associated with one of the devices (not shown). Alternatively, the portion 14 of chassis 16 may be associated with a separate device, such as an equipment rack (not shown). The strain relief assembly 10 transfers to the housing or chassis 16 strain applied to one end 18 of the fiber optic cable 12, thereby preventing the strain from being conducted to the other end 20 of fiber optic cable 12.

In the embodiment shown and described herein, the strain relief assembly 10 may comprise a generally cylindrically shaped, spool-like member 22 having a pair of slots 24, 26 therein that divide the spool-like member 22 into a first hemi-spool portion 28 and a second hemi-spool portion 30. The slots 24, 26 do not extend along the full length 32 (FIG. 2) of the generally cylindrically shaped, spool-like member 22. Accordingly, the slots 24, 26 define a pair of respective bridge sections 34 and 36 (bridge section 36 is not shown in FIGS. 1 and 2, but a portion of bridge section 36 is visible in FIG. 3). The bridge sections 34 and 36 secure together the first and second hemi-spool portions 28 and 30, but are severable to allow the second hemi-spool section 30 to be detached or removed from the first hemi-spool section 28. As will be discussed in greater detail below, the ability to detach the first and second hemi-spool sections 28 and 30 allows the strain relief assembly 10 to provide sufficient take-up to absorb or accommodate extra cable length. See FIG. 3. This arrangement can also be used to reduce the number of cable turns, thereby reducing signal attenuation.

With reference back now to FIG. 1, each hemi-spool portion 28 and 30 may be provided with one or more mounting holes 38 therein to allow the strain relief assembly 10 to be fixedly secured to the portion 14 of chassis 16 by one or more screws (not shown).

Each hemi-spool portion 28 and 30 defines a respective curved outside surface 40 and 42 for receiving at least a portion of the fiber optic cable 12. In many applications, the fiber optic cable 12 will be wrapped around the curved outside surfaces 40, 42 defined by the respective hemi-spool portions 28 and 30 in the manner illustrated in FIG. 1. Wrapping the fiber optic cable 12 around the strain relief assembly 10 allows the strain relief assembly 10 to absorb strain applied to one end 18 of the cable 12, thereby preventing it from being conducted to the other end 20 of the cable 12. Wrapping the fiber optic cable 12 more than once around the strain relief assembly 10 provides take-up to absorb or accommodate extra cable length.

It is generally preferred, but not required, to provide each curved outside surface 40, 42 with at least one, and preferably a plurality, of guide flanges 44. Each guide flange 44 extends generally radially outwardly from the curved outside surface (e.g., 40 or 42) of the strain relief assembly 10 in the manner best seen in FIG. 1. If a curved outside surface (e.g., 40, 42) is provided with two or more guide flanges 44, each guide flange may be provided with one or more holes 46 therein. A retaining or retainer pin 48 sized to be received by the holes 46 may then be inserted through the holes 46 to assist in retaining the fiber optic cable 12 between the guide flanges 44.

The top end 50 of strain relief assembly 10 may be provided with one or more flanges 52, 54 which define a recessed portion 56 on the top end 50 of strain relief assembly 10. The recessed portion 56 is sized to receive the bottom end 58 of strain relief assembly 10, thereby allowing two or more identical strain relief assemblies 10, 10' to be stacked on one another. See FIG. 4.

The strain relief assembly 10 may be used as follows to provide strain relief to a fiber optic cable 12. Assuming that the strain relief assembly 10 has been mounted to a portion 14 of a suitable chassis or frame assembly 16, a user would wrap a portion of the fiber optic cable 12 around the curved outer surfaces 40 and 42 defined by the respective hemi-spool portions 28 and 30. While some degree of strain relief may be provided by wrapping the cable 12 only around a portion of the strain relief assembly (e.g., so that the cable 12 contacts the spool-like member 22 over an arc, say from 90–360 degrees), it will be generally preferable to wrap the fiber optic cable at least once around the strain relief assembly 10. Of course, the cable 12 can be wrapped more than once around the strain relief assembly 10 in order to take-up or accommodate extra cable. If so, it will be generally desirable to wrap the cable 12 around the strain relief assembly 10 so that at least some of the cable 12 is contained between the guide flanges 44. After the cable 12 has been wrapped around the strain relief assembly 10, one or more retaining pins 48 may be inserted through the holes 46 provided in the guide flanges 44 to retain the cable 12 between the guide flanges 44. Thereafter, the strain relief assembly 10 will absorb strain applied to a first end 18 of cable 12, transferring the strain to the mounting plate or chassis 16 and preventing it from reaching the other end 20 of cable 12.

Figure 3:
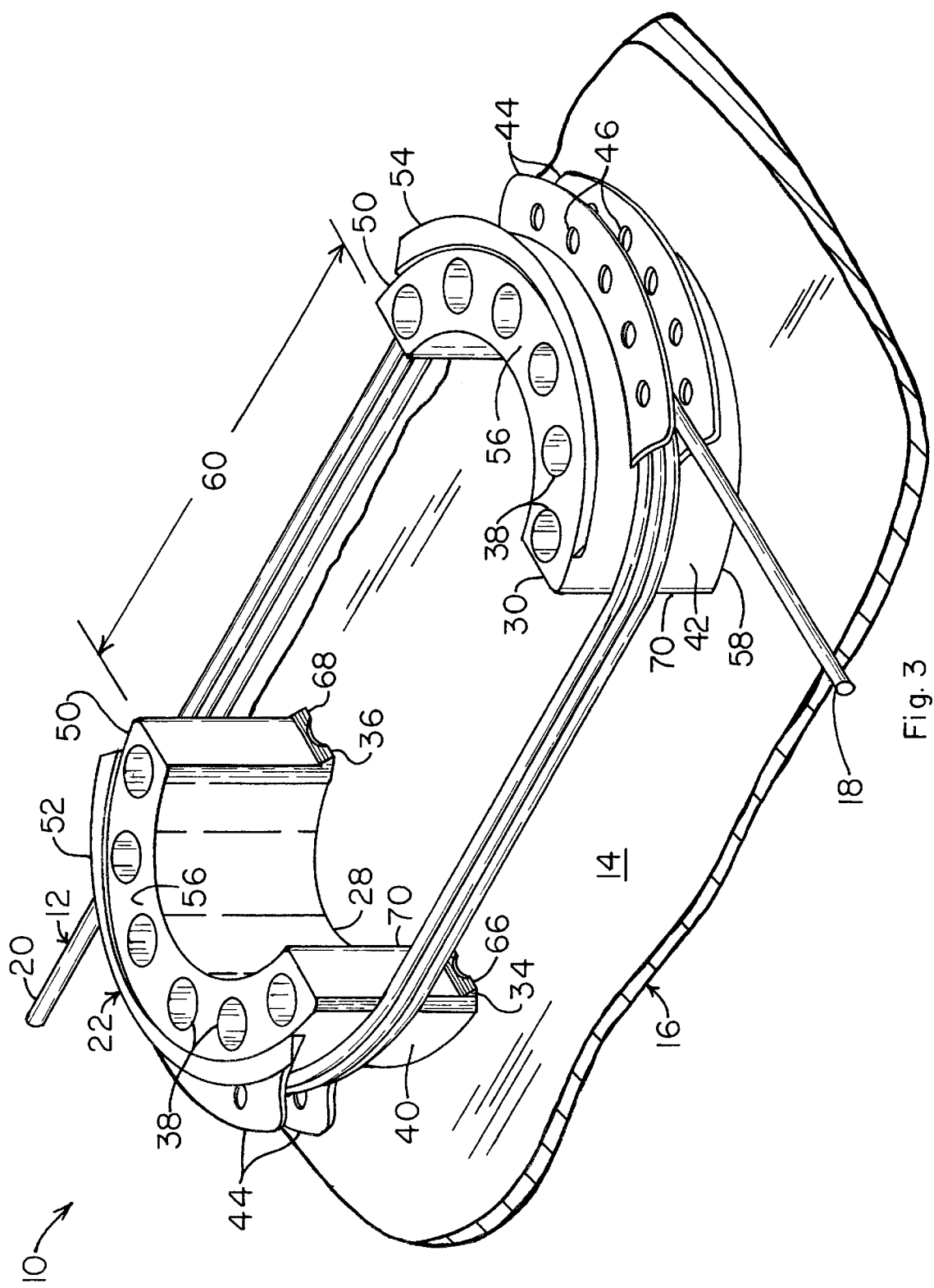
FIG. 3 is a perspective view of the strain relief assembly with the two hemi-spool portions of the strain relief assembly separated to provide take-up for extra cable-length.

Take-up for additional cable lengths may be provided by separating the first and second hemi-spool portions 28 and 30 and by mounting them a spaced distance 60 apart, as best seen in FIG. 3. As will be described in greater detail below, the first and second hemi-spool portions 28 and 30 may be separated by severing the bridge sections 34 and 36. Thereafter, the fiber optic cable 12 may be wrapped around the hemi-spool portions 28 and 30, with the spaced distance 60 between the hemi-spool portions 28 and 30 allowing the strain relief assembly 10 to accommodate much longer lengths of excess cable 12.

A significant advantage of the strain relief assembly 10 according to the present invention is that it provides effective strain relief for fiber optic cables, but without the need to crimp or otherwise grasp the cable. Consequently, the present invention substantially reduces the likelihood that the fiber optic cable will be degraded in performance or even severed by the action of the strain relief assembly 10. The strain relief assembly 10 also constrains the minimum bend radius of the cable, preventing the cable from being bent in a radius of curvature that is less than that associated with each hemi-spool portion. Another significant advantage of the present invention is that in addition to providing effective strain relief, it can also provide a certain degree of take-up to accommodate additional cable lengths. In fact, the present invention is capable of providing an almost unlimited degree of take-up by simply mounting the two hemi-spool portions 28 and 30 a spaced distance apart. Additional take-up and/or strain relief for additional fiber optic cables may be provided by mounting two or more strain relief assemblies on top of one another, in the manner illustrated in FIG. 4.

Still yet other advantages are associated with the present invention. For example, in one preferred embodiment, the two hemi-spool portions 28 and 30 may be formed as a single component, with the bridge sections 34 and 36 connecting the two hemi-spool portions 28 and 30. The two connected hemi-spool portions may then be mounted and used in the manner illustrated in FIG. 1. However, if additional take-up is required, the two hemi-spool portions 28 and 30 may be easily separated from one another by simply severing the bridge sections 34 and 36. The now separated hemi-spool portions 28 and 30 may then be mounted any convenient spaced distance 60 apart in order to accommodate the extra cabling that may be present in a particular installation.

Having briefly described the strain relief assembly 10 according to one preferred embodiment of the present invention, as well as some of its more significant features and advantages, the various embodiments and preferred uses of the strain relief assembly of the present invention will now be described in detail. However, before proceeding with the description, it should be noted that while the strain relief assembly 10 is shown and described herein as it could be used with fiber optic cable 12, it is not limited to such applications and may be used with other types of cables or filament-like members. For example, the present invention could also be used to provide strain relief for electrical wires and/or cabling, or a mixture of electrical and fiber optic cabling. In another application, the strain relief assembly could also be used in conjunction with pneumatic tubing or hoses, which are also sensitive to the crimping forces typically associated with conventional strain relief devices. Still yet other applications are possible, as would be obvious to persons having ordinary skill in the art after having become familiar with the teachings of the present invention. Consequently, the strain relief assembly according to the present invention should not be regarded as limited to the type of cabling and to the situations and applications shown and described herein.

With the foregoing considerations in mind, one embodiment of the strain relief assembly 10 according to the present invention is shown and described herein as it could be used to provide strain relief to a fiber optic cable 12 of the type commonly used to transmit data in the form of light signals (not shown) between two or more devices (not shown). In order to provide the strain relief function, the strain relief assembly 10 needs to be mounted to a base or chassis suitable for carrying the strain load that is expected to be imparted on the cable 12. Accordingly, and in most applications, the strain relief assembly 10 may be mounted to a portion 14 of the housing or chassis 16 associated with one of the devices (not shown) to which the fiber optic cable 12 is to be connected. Alternatively, the strain relief assembly 10 may be mounted to a separate device, such as an equipment rack (not shown) configured to house the device or devices connected by the fiber optic cable 12. Still other mounting arrangements are possible, and the present invention should not be regarded as limited to any particular mounting arrangement for the strain relief assembly 10.

In the embodiment shown and described herein, the strain relief assembly 10 may comprise a generally cylindrically shaped, spool-like member 22, although other curved shapes are possible. The spool-like member 22 may be fabricated from any of a wide range of materials (e.g., metals or plastics) that would be suitable for the intended application. By way of example, in one preferred embodiment, the spool-like member 22 is formed as a single, unitary piece from a moldable thermoplastic material, such as nylon. Alternatively, other types of plastic materials (e.g., polycarbonate plastics) may be used, as would be obvious to persons having ordinary skill in the art after having become familiar with the teachings of the present invention.

It is generally preferred, but not required, that the generally cylindrically shaped, spool-like member 22 be provided with a generally cylindrically shaped central opening 62 therein. The central opening 62 reduces the overall weight of the strain relief assembly 10 and the amount of material required to form the strain relief assembly 10, particularly if the spool-like member is molded from a thermo-plastic material.

The generally cylindrically shaped, spool-like member 22 may also be provided with a pair of slots 24, 26 therein that divide the spool-like member 22 into a first hemi-spool portion 28 and a second hemi-spool portion 30. In the embodiment shown and described herein, the slots 24 and 26 are generally radially oriented and extend along the length 32 (FIG. 2) of the spool-like member 22 in a manner generally parallel to a central axis 64 of the spool-like member 22, as best seen in FIG. 1. Alternatively, other orientations, such as a helical orientation (FIG. 5), are possible, as would be obvious to persons having ordinary skill in the art after having become familiar with the teachings of the present invention. Consequently, the present invention should not be regarded as limited to slots 24 and 26 having the particular orientation and configuration shown and described herein. As will be described in greater detail below, the slots 24 and 26 may be provided with respective radiused edges 70 to prevent the edges 70 from inadvertently kinking or digging into the fiber optic cable 12.

The slots 24 and 26 do not extend along the full length 32 (FIG. 2) of the spool-like member 22, but instead terminate before reaching the bottom end 58 of the spool-like member 22. Consequently, each slot 24, 26 defines a corresponding bridge section 34, 36 (bridge section 36 is not shown in FIGS. 1 and 2, but a portion of bridge section 36 is visible in FIG. 3). The bridge sections 34 and 36 secure together the first and second hemi-spool portions 28 and 30 defined by the slots 24 and 26. Of course, the bridge sections 34 and 36 need not be located at the bottom portion 58 of the spool-like member 22, and could instead be located at other positions, such as at the top end 50 of spool 22, or somewhere between the top and bottom ends 50 and 58.

Figure 2:
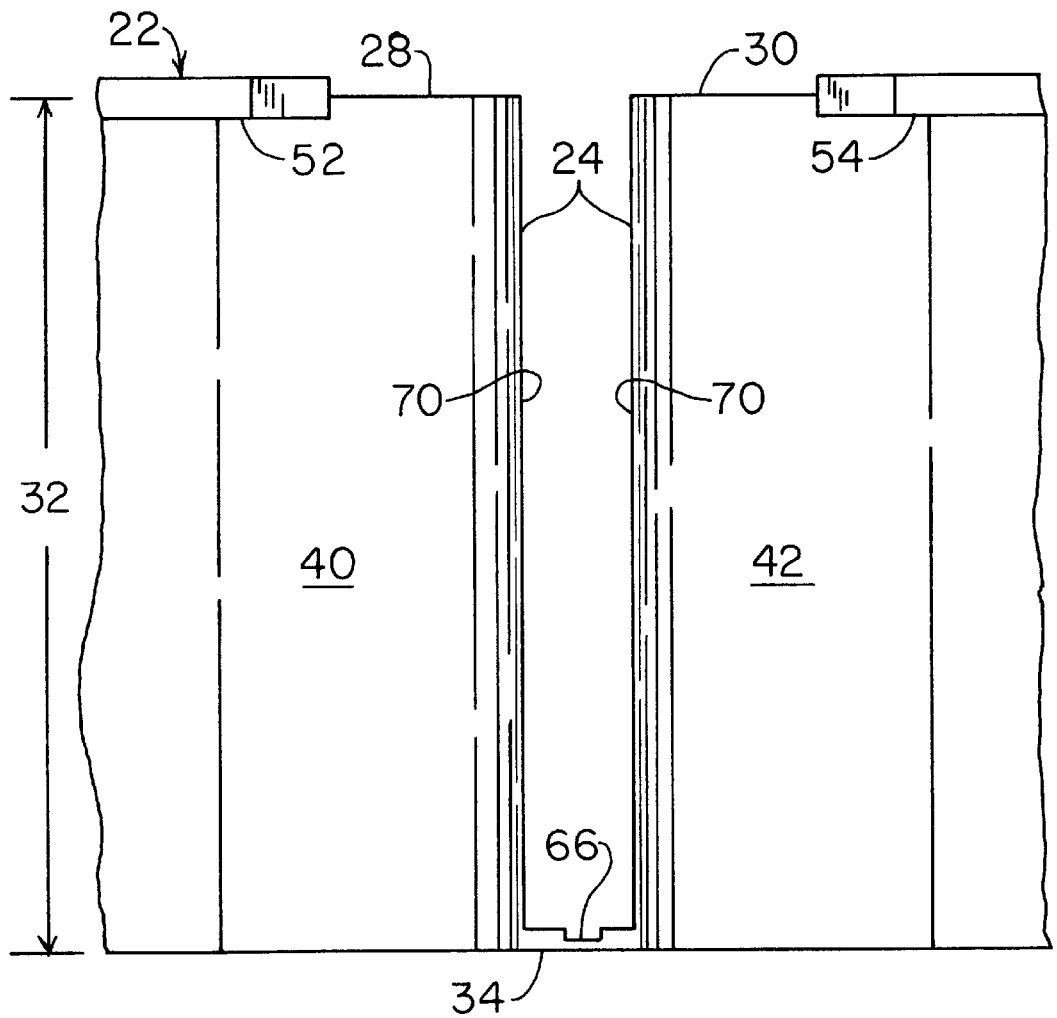
FIG. 2 is an enlarged side view in elevation of a portion of the strain relief assembly illustrated in FIG. 1 more clearly showing the radial slot therein and the bridge section that connects together two hemi-spool portions of the strain relief assembly.

Regardless of the particular locations of the bridge sections 34, 36, each bridge section 34, 36 is severable (i.e., breakable) to allow the second hemi-spool section 30 to be detached or removed from the first hemi-spool section 28. Accordingly, it is generally preferred, but not required, to provide each bridge section 34, 36 with a corresponding necked-down or small cross-section portion 66, 68 (FIGS. 2 and 3). The necked-down portions 66, 68 serve as stress-risers, encouraging the bridge sections 34 and 36 to fracture at the necked-down portions when the joint is flexed. Such an arrangement allows the two hemi-spool portions 28 and 30 to be easily and cleanly separated by prying the hemi-spool portions 28, 30 apart from the top end 50 of spool-like member 22.

Referring back now to FIG. 1, each hemi-spool portion 28 and 30 may be provided with one or more mounting holes 38 therein to allow the strain relief assembly 10 to be fixedly secured to the portion 14 of chassis 16 by one or more screws (not shown). The mounting holes 38 may be provided with internal threads (not shown) to receive the threads provided on a mounting screw (not shown) which may be threaded into the mounting holes 38 from the back side 72 of the portion 14 of chassis 16. Alternatively, other arrangements may be used, as would be obvious to persons having ordinary skill in the art after having become familiar with the teachings of the present invention.

Each hemi-spool portion 28 and 30 defines a respective curved outside surface 40 and 42 for receiving at least a portion of the fiber optic cable 12. The curved outside surfaces 40 and 42 should be provided with radii of curvature that are greater than the minimum bend radius of the fiber optic cable 12 to ensure that the cable 12 will not be damaged or otherwise degraded by wrapping it around the strain relief assembly 10. As mentioned above, it is generally preferred that the edges 70 formed by the slots 24 and 26 be radiused or smoothed in order to reduce the likelihood that they will kink, gauge, or otherwise chafe the fiber optic cable 12.

It is generally preferred, but not required, that each curved outside surface 40 and 42 be provided with at least one, and preferably a plurality, of guide flanges 44. Each guide flange 44 may extend generally radially outwardly from the curved outside surface (e.g., 40 or 42, as the case may be) of the strain relief assembly 10 in the manner best seen in FIG. 1. If a given curved outside surface (e.g., 40 or 42) is provided with two or more guide flanges 44, each guide flange may be provided with one or more holes 46 therein. A retaining pin 48 sized to be received by the holes 46 may then be inserted through the holes 46 to assist in retaining the fiber optic cable 12 between the guide flanges 44.

Figure 4:
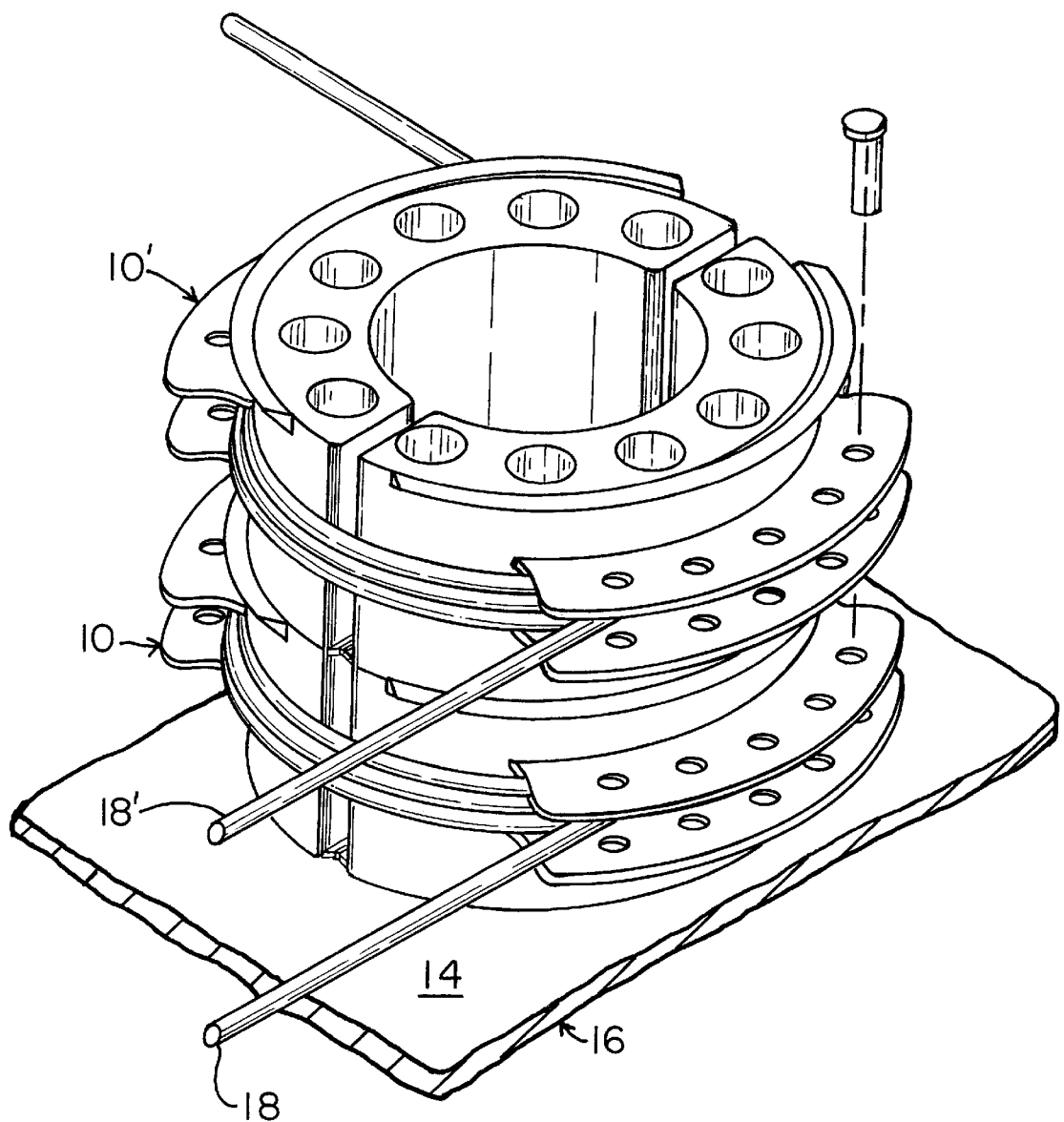
FIG. 4 is a perspective view of a stacked arrangement of two strain relief assemblies.

The top end 50 of strain relief assembly 10 may be recessed in order to receive a second strain relief assembly 10' as illustrated in FIG. 4. In the embodiment shown and described herein, a recessed portion 56 is formed in the top end 50 of spool-like member 22 by a pair of flanges 52 and 54. See FIG. 1. Alternatively, the recessed portion 56 may be formed in other manners, as would be obvious to persons having ordinary skill in the art after having become familiar with the teachings of the present invention.

As was mentioned above, the generally cylindrically shaped, spool-like member 22 of strain relief assembly 10 may be fabricated from any of a wide range of materials and in accordance with any of a wide range of processes now known in the art or that may be developed in the future. However, by way of example, in the embodiment shown and described herein, the entire spool-like member 22, as well as the various features and surfaces defined thereby (e.g., the slots 24, 26, the bridge sections 34, 36, the mounting holes 38, the guide flanges 44, the recessed portion 56, and the central opening 62) are molded as a single, unitary piece from a moldable thermoplastic material, such as nylon. Such a molding process allows the spool-like member 22 to be quickly, easily, and inexpensively manufactured in large quantities. Alternatively, of course, other fabrication techniques may also be used.

The strain relief assembly 10 may be used as follows to provide strain relief to a fiber optic cable 12. Assuming that the strain relief assembly 10 has been mounted to a portion 14 of a suitable chassis or frame assembly 16, a user would wrap a portion of the fiber optic cable 12 around the curved outer surfaces 40 and 42 defined by the respective hemi-spool portions 28 and 30. While some degree of strain relief may be provided by wrapping the cable 12 only around a portion of the strain relief assembly (e.g., so that the cable 12 contacts the spool-like member 22 over an arc, e.g., from 90–360 degrees, although arcs less than 90 degrees may be sufficient in certain circumstances), it will be generally preferable to wrap the fiber optic cable 12 at least once around the strain relief assembly 10. Alternatively, the cable 12 may be wrapped more than once around the strain relief assembly 10 in order to take-up or accommodate extra cable. If so, it will be generally desirable to wrap the cable 12 around the strain relief assembly 10 so that at least some of the cable 12 is contained between the guide flanges 44. See FIG. 1.

After the cable 12 has been wrapped around the strain relief assembly 10, one or more retaining pins 48 may be inserted through the holes 46 provided in the guide flanges 44 to retain the cable 12 between the guide flanges 44. Thereafter, the strain relief assembly 10 will absorb strain applied to a first end 18 of cable 12, transferring the strain to the mounting plate or chassis 16 and preventing it from reaching the other end 20 of cable 12.

Take-up for additional cable lengths may be provided by the present invention by separating the first and second hemi-spool portions 28 and 30 and thereafter by mounting them a spaced distance 60 apart, as best seen in FIG. 3. The first and second hemi-spool portions 28 and 30 may be separated by severing the bridge sections 34 and 36. In one embodiment wherein the spool-like member 22 is molded as a single piece from a thermoplastic material, the bridge sections 34 and 36 may be severed by prying apart the hemi-spool portions 28 and 30 from the top end 50. The bridge sections 34 and 36 usually will fracture at the respective necked-down portions 66 and 68, separating the two hemi-spool portions 28 and 30. Thereafter, the fiber optic cable 12 may be wrapped around the hemi-spool portions 28 and 30, with the spaced distance 60 between the hemi-spool portions 28 and 30 allowing the strain relief assembly 10 to accommodate much longer lengths of excess cable 12.

Additional cabling and/or take-up may be provided by mounting first and second strain relief assemblies 10 and 10' in stacked relationship, as shown in FIG. 4. A first fiber optic cable 18 may be wrapped around the first strain relief assembly 10, and a second fiber optic cable 18' may be wrapped around the second strain relief assembly 10'. Alternatively, a single cable may be wrapped around both strain relief assemblies 10 and 10'. In still another arrangement, each strain relief assembly 10 and 10' may be broken into two pieces (as in the configuration illustrated in FIG. 3), with each respective hemi-spool portion being stacked on top of another to form a two level strain relief assembly wherein the hemi-spool portions are mounted a spaced-distance apart.

Figure 5:
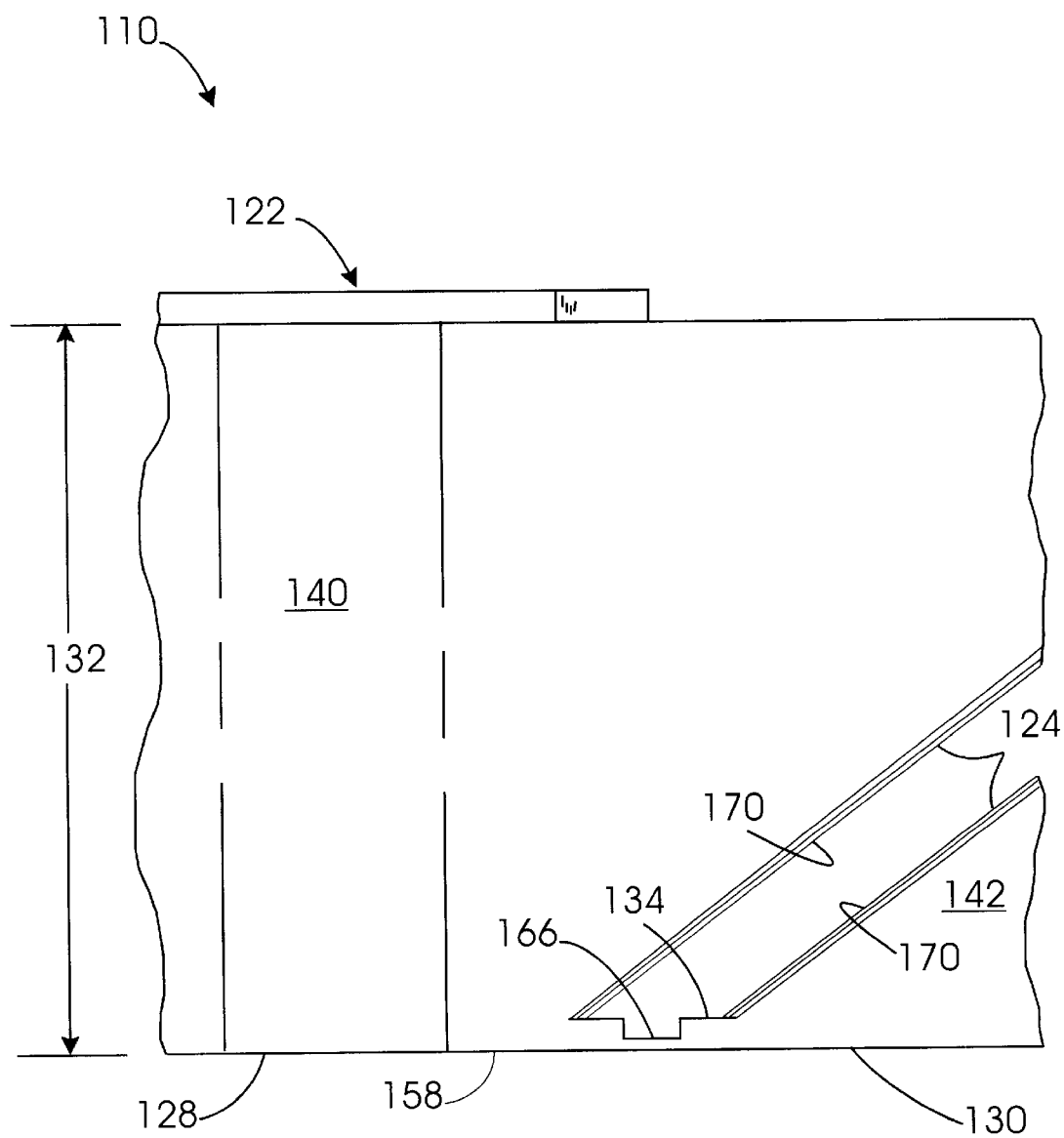
FIG. 5 is an enlarged side view in elevation of a portion of a strain relief assembly according to an alternative embodiment of the invention having a radial slot extending helically therein.

A second embodiment 110 of the strain relief assembly according to the present invention is illustrated in FIG. 5 and may include a generally cylindrically shaped spool-like member 122, although other curved shapes are possible. The spool-like member 122 may be provided with a first slot 124 and a second slot (the second slot is not shown in FIG. 5) that divide the spool-like member 122 into a first hemi-spool portion 128 and a second hemi-spool portion 130. Each hemi-spool portion 128 and 130 defines a respective curved outside surface 140 and 142 for receiving at least a portion of the fiber optic cable 12 (fiber optic cable 12 is not shown in FIG. 5, but is shown in FIG. 1).

In this alternative embodiment 110, the first 124 and second slots may be generally helically oriented and extend along the length 132 of the spool-like member 122. The first 124 and second slots may each be provided with respective radiused edges 170 to prevent the edges 170 from inadvertently kinking or digging into the fiber optical cable 12.

As before with the first embodiment 10, the first 124 and second slots of the second embodiment 110 do not extend along the full length 132 of the spool-like member 122, but instead terminate before reaching the bottom end 158 of the spool-like member 122. Consequently, the first 124 and second slots define respective first 134 and second bridge sections (the second bridge section defined by the second slot is not shown in FIG. 5) located at the bottom portion 158 of the spool-like member 122, although other locations are possible for the first 134 and second bridge sections.

Regardless of their particular location, however, the first 134 and second bridge sections secure together the first and second hemi-spool portion 128 and 130. The first 134 and second bridge sections may each be severable (i.e., breakable) to allow the second hemi-spool portion 130 to be detached or removed from the first hemi-spool section 128. Accordingly, it is generally preferred, but not required, to provide the first 134 and second bridge sections with a corresponding necked-downed or small cross-section portion 166 (the necked-down portion of the second bridge section is not shown in FIG. 5), which serve as stress-risers and encourage the first 134 and second bridge sections to fracture at the necked-down portions when the joint is flexed.

It is contemplated that the inventive concepts herein described may be variously otherwise embodied and it is intended that the appended claims be construed to include alternative embodiments of the invention except insofar as limited by the prior art.

What is claimed is:

1. A strain relief comprising a spool-like member having a length, said spool-like member defining at least one radial slot therein that extends along a portion of the length of said spool-like member, said radial slot dividing said spool-like member into a first hemi-spool portion and a second hemi-spool portion, said radial slot also defining a bridge section connecting said first and second hemi-spool portions, said bridge section being severable to allow said second hemi-spool portion to be separated from said first hemi-spool portion.

2. The strain relief of claim 1, further comprising a first guide flange extending radially outwardly from said spool-like member.

3. The strain relief of claim 2, further comprising a second guide flange extending radially outwardly from said spool-like member, said second guide flange being positioned a spaced distance from said first guide flange along the length of said spool-like member.

4. The strain relief of claim 3, wherein said first and second guide flanges define respective first and second holes therein, said first and second holes being generally axially and radially aligned with one another.

5. The strain relief of claim 4, further comprising a retainer pin positioned in said first and second holes.

6. The strain relief of claim 1, wherein said spool-like member comprises a first end and a second end, said first end having a recessed portion therein, said recessed portion being sized to receive a second spool-like member therein.

7. The strain relief of claim 6, wherein said recessed portion is defined by a first flange on said first hemi-spool portion and a second flange on said second hemi-spool portion.

8. The strain relief of claim 1, wherein said radial slot extends axially along a portion of the length of said spool-like member.

9. The strain relief of claim 1, wherein said radial slot extends helically along a portion of the length of said spool-like member.

10. The strain relief of claim 1, wherein said spool-like member also defines a central opening therein that extends along the length of said spool-like member, said spool-like member defining first and second radial slots therein that extend along a portion of the length of said spool-like member, said first and second radial slots defining respective first and second bridge sections connecting said first and second hemi-spool portions, said first and second bridge sections being severable to allow said second hemi-spool portion to be separated from said first hemi-spool portion.

11. The strain relief of claim 1, wherein said spool-like member defines at least one mounting hole therein that extends along the length of said spool-like member, said at least one mounting hole allowing said spool-like member to be mounted to a support chassis.

12. The strain relief of claim 1, wherein said spool-like member comprises a thermoplastic resin.

13. A strain relief for receiving strain from a flexible, cable-like member, comprising:
    a first portion defining a first curved outside surface;
    a second portion defining a second curved outside surface; and
    a severable bridge portion connecting said first portion and said second portion, said severable bridge portion holding said first and second portions together so that the respective first and second curved outside surfaces are generally aligned with one another so as to define a curved surface of revolution suitable for allowing a portion of the flexible, cable-like member to be wrapped at least partially around said curved surface of revolution.

14. A strain relief comprising a generally cylindrically shaped, spool-like member having a length and a diameter, said cylindrically shaped, spool-like member defining a central opening therein that extends along the length of said cylindrically shaped, spool-like member, said cylindrically shaped, spool-like member also defining first and second radial slots therein that extend along a portion of the length of said cylindrically shaped, spool-like member, said first and second radial slots dividing said cylindrically shaped, spool-like member into a first hemi-spool portion and a second hemi-spool portion, said first and second radial slots also defining respective first and second bridge sections connecting said first and second hemi-spool portions, said first and second bridge sections being severable to allow said second hemi-spool portion to be separated from said first hemi-spool portion.

15. The strain relief of claim 14, further comprising a first guide flange extending radially outwardly from said generally cylindrically shaped, spool-like member.

16. The strain relief of claim 15, further comprising a second guide flange extending radially outwardly from said generally cylindrically shaped, spool-like member, said second guide flange being positioned an axially spaced distance from said first guide flange.

17. The strain relief of claim 16, wherein said first and second guide flanges define respective first and second holes therein, said first and second holes being generally axially and radially aligned with one another.

18. The strain relief of claim 17, further comprising a retainer pin positioned in said first and second holes.

19. The strain relief of claim 18, wherein said generally cylindrically shaped, spool-like member defines a first end and a second end, said first end having a recessed portion therein, said recessed portion being sized to receive a second generally cylindrically shaped, spool-like member therein.

20. The strain relief of claim 19, wherein said recessed portion is defined by a first flange on said first hemi-spool portion and a second flange on said second hemi-spool portion.

21. The strain relief of claim 20, wherein said generally cylindrically shaped, spool-like member defines at least one mounting hole therein that extends along the length of said generally cylindrically shaped, spool-like member, said at least one mounting hole allowing said generally cylindrically shaped, spool-like member to be mounted to a support structure.

22. A method for relieving strain from a flexible, cable-like member, comprising:

providing a spool-like member having a length and defining a radial slot therein that extends along a portion of the length of the spool-like member, the radial slot dividing the spool-like member into first and second hemi-spool sections, the radial slot also defining a severable bridge section connecting the first and second hemi-spool sections; and wrapping a portion of the flexible, cable-like member at least partially around the spool-like member.

23. The method of claim 22, further comprising separating the first and second hemi-spool sections before said wrapping.

24. The method of claim 23, wherein said separating comprises severing the bridge section.

25. The method of claim 22, wherein said wrapping comprises wrapping a portion of the flexible, cable-like member at least once around the spool-like member.

\* \* \* \* \*